United States Patent
Inda (10) Patent No.: US 8,808,407 B2
(45) Date of Patent: *Aug. 19, 2014

(54) METHOD OF MANUFACTURING A SOLID LITHIUM ION SECONDARY BATTERY WITH AN ELECTROLYTE LAYER AND/OR POSITIVE ELECTRODE LAYER CONTAINING A CRYSTALLITE HAVING A LITHIUM ION CONDUCTING PROPERTY

(75) Inventor: Yasushi Inda, Kanagawa (JP)

(73) Assignee: Ohara Inc., Sagamihara-shi (JP)

( * ) Notice: Subject to any disclaimer, the term of this patent is extended or adjusted under 35 U.S.C. 154(b) by 338 days.

This patent is subject to a terminal disclaimer.

(21) Appl. No.: 12/364,385

(22) Filed: Feb. 2, 2009

(65) Prior Publication Data

US 2009/0193648 A1 Aug. 6, 2009

Related U.S. Application Data

(60) Provisional application No. 61/027,134, filed on Feb. 8, 2008.

(30) Foreign Application Priority Data

Jan. 31, 2008 (JP) .................. 2008-022168

(51) Int. Cl.
| | |
|---|---|
| *H01M 10/0562* | (2010.01) |
| *H01M 10/058* | (2010.01) |
| *H01M 4/525* | (2010.01) |
| *B05D 1/36* | (2006.01) |
| *B05D 3/02* | (2006.01) |
| *B05D 5/12* | (2006.01) |
| *H01M 10/0525* | (2010.01) |
| *H01M 4/62* | (2006.01) |
| *H01M 10/0585* | (2010.01) |
| *H01M 4/13* | (2010.01) |
| *H01M 4/1391* | (2010.01) |
| *H01M 4/131* | (2010.01) |

(52) U.S. Cl.
CPC ........ *H01M 10/0525* (2013.01); *H01M 4/1391* (2013.01); *H01M 4/131* (2013.01); *H01M 4/624* (2013.01); *H01M 10/0585* (2013.01); *H01M 4/621* (2013.01); *H01M 4/13* (2013.01); *H01M 2300/0071* (2013.01); *Y02E 60/122* (2013.01); *H01M 2300/0091* (2013.01); *H01M 10/0562* (2013.01)
USPC ....... 29/623.5; 429/231.1; 429/319; 429/322; 427/283; 427/376.2; 427/419.3

(58) Field of Classification Search
USPC ......... 429/231.95, 231.1, 319, 322; 29/623.5; 427/283, 376.2, 419.3
See application file for complete search history.

(56) References Cited

U.S. PATENT DOCUMENTS

| 2004/0106046 | A1* | 6/2004 | Inda | 429/322 |
| 2007/0087269 | A1* | 4/2007 | Inda | 429/322 |

FOREIGN PATENT DOCUMENTS

| EP | 1424743 A1 | 6/2004 |
| EP | 1760819 A2 | 3/2007 |

(Continued)

OTHER PUBLICATIONS

European Search Report dated Jun. 5, 2009, issued in corresponding European Patent Application No. 09151783.9.

(Continued)

*Primary Examiner* — Sean P Cullen
(74) *Attorney, Agent, or Firm* — Westerman, Hattori, Daniels & Adrian, LLP (57) ABSTRACT

A method of manufacturing a lithium ion secondary battery comprising the steps of: forming a laminate by laminating an electrolyte green sheet and a positive electrode green sheet; and sintering the laminate is provided. At least one of the electrolyte green sheet and the positive electrode green sheet contains an amorphous oxide glass powder in which a crystalline having a lithium ion conducting property is precipitated in the step of sintering. A solid state battery produced in accordance with the method is provided.

19 Claims, 1 Drawing Sheet (56) References Cited

FOREIGN PATENT DOCUMENTS

| EP | 1775789 A2 | 4/2007 |
|---|---|---|
| JP | 2004-185862 A | 7/2004 |
| JP | 2006-120779 A | 5/2006 |
| JP | 2007-005279 A | 1/2007 |
| JP | 2007-227362 A | 9/2007 |
| JP | 2007-294429 A | 11/2007 |

OTHER PUBLICATIONS

Japanese Office Action dated Feb. 26, 2013, issued in corresponding Japanese patent application No. 2009-018851, w/ partial English translation.

* cited by examiner

METHOD OF MANUFACTURING A SOLID LITHIUM ION SECONDARY BATTERY WITH AN ELECTROLYTE LAYER AND/OR POSITIVE ELECTRODE LAYER CONTAINING A CRYSTALLITE HAVING A LITHIUM ION CONDUCTING PROPERTY

CROSS REFERENCE TO RELATED APPLICATIONS

This application is based upon and claims the benefits of priorities from Japanese patent application number 2008-022168 filed on Jan. 31, 2008 and U.S. provisional application Ser. No. 61/027,134 filed on Feb. 8, 2008, the entire contents of which are incorporated herein by reference.

FIELD OF THE INVENTION

The present invention relates to a method for manufacturing a lithium ion secondary battery, more specifically, it relates to a method of manufacturing a laminate, which is constituted of a positive electrode green sheet, an electrolyte green sheet, and/or a negative electrode green sheet. It also relates to the lithium ion secondary battery manufactured by this method.

BACKGROUND ART

Recently, handheld electronic devices such as mobile phone and the like have been improved for higher performance and smaller size such that higher energy density and smaller size of batteries used in the handheld electronic devices are desired. In general, a lithium battery can provide a high voltage and achieve a high energy density so as to be expected to be utilized as the power source for such handheld electronic devices. In such lithium battery, lithium transition metal complex oxide such as lithium cobaltate ($LiCoO_2$), lithium manganate ($LiMn_2O_4$), lithium nickelate ($LiNiO_2$), etc., is generally used as a positive electrode active material. As a negative electrode active material, a carbon material such as graphite, fibrous carbon, and so on is used. An organic electrolyte solution is generally used in such lithium battery, and a polymer electrolyte, in which a macromolecular electrolyte and an organic electrolyte solution are mixed, is also being investigated. Since a liquid electrolyte is used in such lithium battery or polymer electrolyte battery, leakage and ignition of the liquid electrolyte can be caused such that the reliability of the battery is low. Also, since the battery performance may be drastically lowered if electrolyte solution freezes at a low temperature or vapors at a high temperature, an operating temperature range of the battery is limited. Therefore, the research and development of the lithium battery as a highly reliable battery using a solid electrolyte having a lithium ion conductive property instead of the organic electrolyte solution is being desired.

Since such a solid state battery does not use a flammable organic solvent, it is free from leakage of the solvent and fire therefrom such that excellent safety is provided. For example, Japanese patent application publication No. 2007-227362 discloses a method of manufacturing a laminate by forming an active material green sheet and a solid electrolyte green sheet, respectively; laminating the solid electrolyte green sheet on one face of the active material green sheet; forming a current collector green sheet layer on the other face of the active material green sheet; heating thus-laminated body at a temperature from 200 to 400° C. in an oxidizing atmosphere; and sintering at a higher sintering temperature (for example, from 700 to 1000° C.) in a low oxygen atmosphere, Therefore, even if the current collector made of metal material is oxidized during the heating in the oxidizing atmosphere, the oxidized current collector can be reduced during the sintering at the higher sintering temperature (for example, 700 to 1000° C.) in the low oxygen atmosphere. Although addition of glass frits to a current collector slurry is referred to in Japanese patent application publication No. 2007-227362 document, no technical effects thereof are described.

Meanwhile, Japanese patent application publication No. 2007-5279 discloses a laminate comprising: an active material layer; and a solid electrolyte layer bonded to the active material layer by sintering. The active material layer contains a crystalline first substance capable of adsorbing and desorbing lithium ions and the solid electrolyte layer contains a crystalline second substance having a lithium ion conducting property. Here, at least one of the active material layer and the solid electrolyte layer contains an amorphous oxide. The amorphous oxide, for example, may comprise $SiO_2$, $Al_2O_3$, $Na_2O$, $MgO$, $CaO$, etc. Japanese patent application publication No. 2007-5279 states such amorphous oxides are added as a sintering additive such that temperatures at which sintering starts and sintering rates in various kinds of materials can be conformed to the common ones although they may differ depending on the kinds of materials.

SUMMARY OF THE INVENTION

However, while it is especially important that the electrolyte and boundaries between the electrolyte and respective electrode active materials have a high ion conducting property in such a solid state battery (lithium ion secondary battery), the amorphous oxides basically have such a low ion conducting property that it may not be easy to realize high performance of the solid state battery with the amorphous oxides. Although glass, for example, may be added as binder to improve adhesion at the boundaries, such glass has basically a low ion conducting property in many cases. Some of such glass may react with an electrode active material during sintering so as to consequently lower the ion conductivity. In the meantime, a solid electrolyte of high ion conducting property (that is, with a high crystallinity) may not necessarily have good adhesion with an electrode material (for example, an active material) after sintering such that separation between the layers (solid electrolyte and electrode material layers) may occur.

In consideration of the above circumstances, a method for manufacturing a lithium ion secondary battery which can realize strong bonds between layers and a high ion conducting property within the layers by sintering as the layers constituted of a solid electrolyte layer and an electrode layer (e.g., positive electrode layer) that are sintered and bonded mutually and a lithium ion secondary battery prepared by the method are provided in the present invention.

Further features of the present invention, its nature, and various advantages will be more apparent from the accompanying drawings and the following description of the preferred embodiment.

DESCRIPTION OF THE PREFERRED EMBODIMENT

Although an embodiment of the present invention will be described in detail with reference to the drawings, the following description is provided to describe the embodiment of the present invention, and the present invention is not limited to the following embodiment. And the same or related symbols are used to refer to the same or same kind of element and redundant description is omitted.

Figure 1:
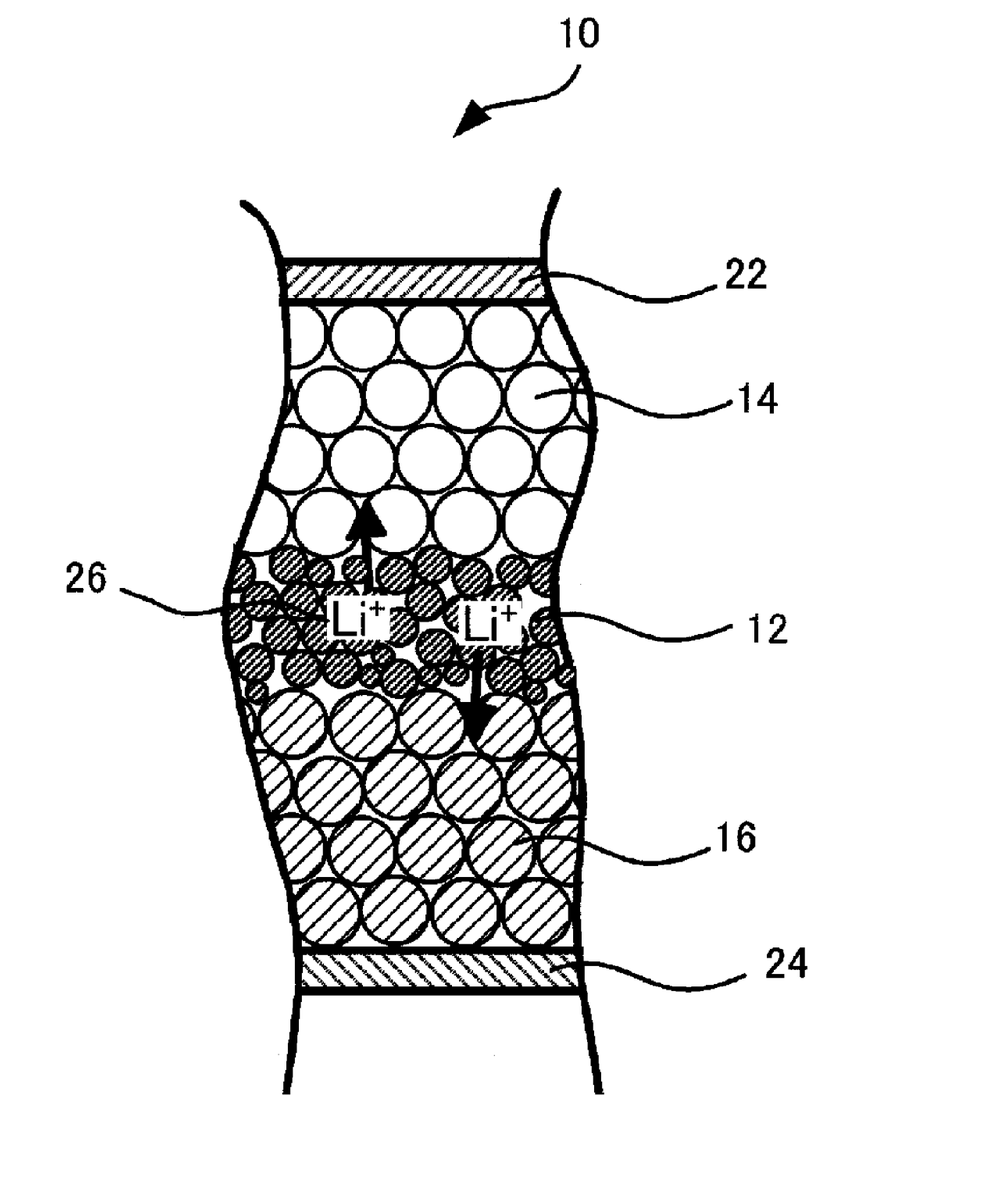
The drawing is a section view of a lithium ion secondary battery according to an embodiment of the present invention.

The drawing shows a section view of a lithium ion secondary battery 10 according to an embodiment of the present invention. The lithium ion secondary battery 10 is configured such that a positive electrode 14 formed by sintering a positive electrode green sheet and a Negative electrode 16 formed by sintering a negative electrode green sheet are disposed on a top face and a bottom face of an electrolyte 12 formed by sintering an electrolyte green sheet, respectively, and that the laminate of the positive electrode 14, the electrolyte 12, and the negative electrode 16 is in turn disposed between a positive electrode current collector 22 and a negative electrode current collector 24. The battery operates as lithium ions 26 inside the electrolyte 12 move to and from the positive and negative electrodes 14, 16 as indicated by arrows in the drawing.

A method for manufacturing a lithium ion secondary battery according to the present invention will now be described. An amorphous oxide glass powder is prepared, and using this powder, the electrolyte green sheet and the positive electrode green sheet are prepared. The respective green sheets are then formed into a arbitrary shape and overlaid to prepare a laminate. The respective green sheets may be prepared independently, but a green sheet may also be formed directly onto another green sheet which will constitute a laminate all together. A negative electrode layer (negative electrode green sheet) is furthermore laminated onto the laminate. The whole laminate is sintered to produce a laminated sintered body. The positive electrode current collector and the negative electrode current collector are then fixed onto the positive electrode side and the negative electrode side of the laminated sintered body, respectively, such that an all solid lithium ion secondary battery may be produced.

The content of oxide glass powder in which a lithium ion conductive crystalline will be precipitated is preferably 50 wt % of total weight of the dried electrolyte green sheet and the dried positive electrode green sheet as the lower limit value, more preferably 53 wt %, and most preferably 55 wt %. If the content is less than 50 wt %, the ion conductivity of the battery may be too low. And the upper limit value may be preferably 75 wt %, more preferably 73 wt %, and most preferably 70 wt %. If the content is more than 75 wt %, the content fraction of the positive electrode active material may be too low such that the battery capacity per unit volume and unit weight may become too low.

If the negative electrode green sheet is to be laminated, the lower limit value of the content of the amorphous oxide glass powder, in which a lithium ion conducting crystalline is precipitated, may be preferably 30 wt %, more preferably 33 wt %, and most preferably 35 wt % of the total weight of the dried electrolyte green sheet and the dried positive electrode green sheet. If the content is less than 30 wt %, the ion conducting property of the battery may be too low. Also, the upper limit value of the content may be preferably 80 wt %, more preferably 78 wt %, and most preferably 77 wt %. If the content exceeds 80 wt %, the content fraction of the negative electrode active material may be too low such that the battery capacity per unit volume and per unit weight may become too low.

With respect to the solid electrolyte green sheet, the lower limit value of the content of the oxide glass, which will express the lithium ion conductivity by sintering, may be preferably 50 wt %, more preferably 55 wt %, and most preferably 60 wt % of the amount of a mixed slurry constituted of the inorganic powder, the organic binder, a plasticizer, a solvent, etc. when the oxide glass is mixed with the organic binder, since higher conductivity may be obtained if more amount of the inorganic material having a lithium ion conducting property after sintering is contained and the number of voids may be reduced after sintering the lower limit value of the content of the amorphous oxide glass powder in the dried solid electrolyte green sheet may be preferably 50 wt %, more preferably 65 wt %, and most preferably 70 wt % for the same reason as mentioned above.

To maintain the sheet shape, the upper limit value of the content of the oxide glass in the solid electrolyte green sheet may be preferably not exceeding 100 wt %, more preferably not exceeding 90 wt %, and most preferably not exceeding 80 wt % of the amount of the mixed slurry. Also, the upper limit value of the content of the lithium oxide glass powder may be preferably not exceeding 100 wt %, more preferably not exceeding 95 wt %, and most preferably not exceeding 90 wt % for the same reason as mentioned above.

With respect to the positive electrode green sheet, the lower limit value of the content of the oxide glass may be preferably at least 1 wt %, more preferably at least 3 wt %, and most preferably at least 5 wt % of the amount of a mixed slurry constituted of the positive electrode active material, the inorganic powder, the organic binder, the plasticizer, the solvent, etc. when the oxide glass is mixed with the organic binder, since it is necessary for the positive electrode to get the ion conductivity. Also, the lower limit value of the content of the oxide glass powder in the dried positive electrode green sheet may be preferably at least 5 wt %, more preferably at least 7 wt %, and most preferably at least 10 wt % for the same reason as mentioned above.

The upper limit value of the content of the oxide glass powder in the positive electrode green sheet is preferably not exceeding 40 wt %, more preferably not exceeding 35 wt %, and most preferably not exceeding 30 wt % of the amount of the mixed slurry since the content of the active material contained in the positive green sheet may be too low such that the battery capacity may become too low if the content fraction of the oxide glass powder is too much. Also, the upper limit value of the content of the oxide glass powder in the dried positive electrode green sheet may be preferably not exceeding 45 wt %, more preferably not exceeding 40 wt %, and most preferably not exceeding 35 wt % for the same reason as mentioned above.

With respect to the negative electrode green sheet, the lower limit value of the content of the oxide glass may be preferably at least 1 wt %, more preferably at least 3 wt %, and most preferably at least 5 wt % of the amount of a mixed slurry constituted of the negative electrode active material, the inorganic powder, the organic binder, the plasticizer, the solvent, etc. when the oxide glass is mixed with the organic binder, since it is necessary for the negative electrode to get the ion conductivity. Also, the lower limit value of the content of the oxide glass powder in the dried negative electrode green sheet may be preferably at least 5 wt %, more preferably at least 7 wt %, and most preferably at least 10 wt % for the same reason as mentioned above.

The upper limit value of the content of the oxide glass powder in the negative electrode green sheet is preferably not exceeding 40 wt %, more preferably not exceeding 35 wt %, and most preferably not exceeding 30 wt % of the amount of the mixed slurry in order to maintain the sheet shape since the content of the active material contained in the negative green sheet may be too low such that the battery capacity may become too low if the content fraction of the oxide glass powder is too much. Also, the upper limit value of the content of the oxide glass powder in the dried negative electrode green sheet may be preferably not exceeding 45 wt %, more preferably not exceeding 40 wt %, and most preferably not exceeding 35 wt % for the same reason as mentioned above.

A powder of an active material is contained in the positive electrode green sheet. Here, as the active material to be used in the positive electrode green sheet, a transition metal compound capable of storing (or adsorbing) and releasing (or desorbing) Li ions may be used and, for example, a transition metal oxide, etc., containing at least one element selected from among the group consisting of manganese, cobalt, nickel, vanadium, niobium, molybdenum, titanium, iron, phosphorus, aluminum, and chromium may be used. With respect to the lower content limit of the active material contained in the positive electrode green sheet, the content is preferably equal to or more than 40 wt %, more preferably equal to or more than 50 wt %, and most preferably equal to or more than 60 wt % since a battery capacity per unit volume after sintering decreases if the content is low. Also because plasticity is lost and handling becomes difficult if the content of the active material contained in the positive electrode sheet is too high, the content is preferably equal to or less than 97 wt %, more preferably equal to or less than 94 wt % and most preferably equal to or less than 90 wt %.

To obtain the positive electrode green sheet with the above-mentioned content of the active material and to prepare a slurry that can be coated satisfactorily, the amount of the positive electrode active material with respect to the amount of the mixed slurry constituted of the positive electrode active material powder, an inorganic powder, an organic binder, a plasticizer, a solvent, etc., is preferably equal to or more than 10 wt %, more preferably equal to or more than 15 wt %, and most preferably equal to or more than 20 wt %.

To prepare a slurry that can be coated satisfactorily, the upper content limit of the active material with respect to the amount of the mixed slurry is preferably equal to or less than 90 wt %, more preferably equal to or less than 80 wt %, and most preferably equal to or less than 75 wt %.

In a case where an electron conducting property of the positive electrode active material is low, the electron conducting property can be increased by adding an electron conducting additive. As the electron conducting additive, a microparticulate or fibrous carbon material or metal may be used. Metals that can be used include metals, such as titanium, nickel, chromium, iron, stainless steel, aluminum, etc., and noble metals, such as platinum, gold, rhodium, etc.

Also, a powder of an active material is contained in the negative electrode green sheet in addition to the abovementioned materials. As the active material used in the negative electrode green sheet, an alloy of aluminum, silicon, tin, etc., capable of storing (or adsorbing) and releasing (or desorbing) Li ions or a metal oxide material of titanium, vanadium, chromium, niobium, silicon, etc., may be contained.

The lower limit value of the content of the active material in the negative electrode green sheet is preferably at least 40 wt %, more preferably at least 50 wt %, and most preferably at least 60 wt % since the content of the active material contained in the negative green sheet may be too low such that the battery capacity per unit volume after sintering may become too low.

Also, the lower content limit of the active material contained in the negative green sheet is preferably equal to or more than 10 wt %, more preferably equal to or more than 15 wt %, and most preferably equal to or more than 20 wt % with respect to the amount of the mixed slurry constituted of the positive electrode active material powder, the inorganic powder, the organic binder, the plasticizer, the solvent, etc. because of the reason described above and in order to prepare the slurry that can be coated satisfactorily.

Also, the upper content limit of the active material with respect to the amount of the mixed slurry is preferably equal to or less than 90 wt %, more preferably equal to or less than 80 wt %, and most preferably equal to or less than 75 wt % since the slurry must be prepared using the binder and the solvent.

Also, in the case where the electron conducting property of the negative electrode active material is low, the electron conducting property can be imparted by adding an electron conducting additive. As the electron conducting additive, a microparticulate or fibrous carbon material or metal may be used. Metals that can be used include metals, such as titanium, nickel, chromium, iron, stainless steel, aluminum, etc., and noble metals, such as platinum, gold, rhodium, etc.

[Organic Binder]

As the organic-based binder, a general purpose binder that is commercially available as a shaping additive for press molding, rubber pressing, extrusion, or injection molding may be used. More specifically, acrylic resin, ethyl cellulose, polyvinyl butyral, methacrylic resin, urethane resin, butyl methacrylate, vinyl-based copolymer, etc., may be utilized.

In order to make it easier to maintain the sheet shape, the lower limit value of the content of the organic binder may be preferably at least 1 wt %, more preferably at least 3 wt %, and most preferably at least 5 wt % of the amount of the mixed slurry constituted of the active material power (in the case of the positive electrode green sheet or the negative electrode green sheet), inorganic material powder, the organic binder, the plasticizer, the solvent, etc.

Also, the lower limit value of the content of the organic binder in the dried green sheet may be preferably at least 3 wt %, more preferably at least 5 wt %, and most preferably at least 7 wt % for the same reason as mentioned above.

In order to make it easier to reduce the volume fraction of voids after burnout (removing the organic material), the upper limit value of the content of the organic binder may be preferably not exceeding 50 wt %, more preferably not exceeding 40 wt %, and most preferably not exceeding 30 wt %.

Also, the upper limit value of the content of the organic binder in the dried green sheet may be preferably not exceeding 40 wt %, more preferably not exceeding 35 wt %, and most preferably not exceeding 30 wt % for the same reason as mentioned above.

[Solvent]

The solvent may be used to disperse the oxide glass powder uniformly. Although publicly known material such as PVA (polyvinyl alcohol), IPA (isopropyl alcohol), butanol, toluene, xylene, acetonitrile, NMP (N-methylpyrrolidone), etc., may be used as the solvent, alcohol or water is preferable in terms of the environment. Furthermore to obtain a uniform, dense solid electrolyte, an appropriate amount of a dispersant may be added along with the oxide glass powder and the organic binder, and an appropriate amount of a surfactant, etc., may be added to carry out bubble elimination satisfactorily during mixing and drying.

[Others]

The green sheet may also contain a Li-containing inorganic compound at the same time. The Li-containing inorganic compound may work as a sintering additive (binder) and may be effective in binding particles together when the oxide glass is crystallized.

The inorganic compound including Li, for example, may comprise $Li_3PO_4$, $LiPO_3$, $LiI$, $LiN$, $Li_2O$, $Li_2O_2$, $LiF$, etc. It is possible to soften or melt these Li-containing inorganic compounds in particular by adjusting the sintering temperature and atmosphere when these compounds are sintered after mixed with the lithium ion conductive inorganic powder. Some of the softened or molten Li-containing inorganic compounds may flow into gaps in the oxide glass or the glass ceramic in which crystallines have been precipitated, and can strongly bind the oxide glass or the glass ceramic. Also, by selecting an inorganic compound having an Li ion conducting property, the lithium ion conducting property after sintering may be improved.

Addition of a small amount of a highly dielectric, insulating crystalline or glass as an inorganic powder to the green sheet improves a lithium ion diffusion property, thereby providing an effect to improve the lithium ion conducting property. For example, such inorganic powder may include power of $BaTiO_3$, $SrTiO_3$, $Nb_2O_5$, $LaTiO_3$, etc.

[Manufacture of Green Sheet]

As to shaping of the green sheet, publicly know method such as a doctor blade method and calender method may be utilized to make the green sheet in a sheet form. In order to minimize an internal residual solvent amount in a drying step to prevent formation of cracks on a surface, the upper limit value of the thickness of the green sheet after shaping may be preferably not exceeding 200 μm, more preferably not exceeding 150 μm, and most preferably not exceeding 100 μm. To provide a stable handling property, the lower limit value of the thickness of the green sheet is preferably at least 0.1 μm, more preferably at least 0.5 μm, and most preferably at least 1 μm. The green sheet may be formed in any shape as appropriate. To make the solid electrolyte, electrodes, etc. in the desired thickness after sintering, a plurality of green sheets of the same type may be laminated. To improve denseness of the solid electrolyte after sintering, the green sheet may be pressed by a roll press or by uniaxial compression, isotropic compression, etc.

To shorten a sintering time, the upper limit value of the thickness of the laminated green sheets is preferably not exceeding 800 μm, more preferably not exceeding 600 μm, and most preferably not exceeding 400 μm. To reduce waviness, the lower limit value of the thickness of the laminated green sheets is preferably at least 0.5 μm, more preferably at least 1 μm, and most preferably at least 5 μm.

The solid electrolyte green sheet obtained here is further laminated with at least one of the positive electrode green sheet and the negative electrode green sheet to prepare the laminate. Or as mentioned above, another sheet may be directly formed on the green sheet to be laminated together or on a ceramic, etc.

EXAMPLE 1

Applying the processes as described above, a battery was prepared in the way to be described more specifically below.

[Preparation of Amorphous Oxide Glass Powder]

The following raw materials were used: $H_3PO_4$, $Al(PO_3)_3$, and $Li_2CO_3$, manufactured by Nippon Chemical Industrial Co., Ltd.; $SiO_2$, manufactured by Nitchitsu Co., Ltd.; and $TiO_2$, manufactured by Sakai Chemical Industry Co., Ltd. These materials were weighed out to provide a composition of 35.0% $P_2O_5$, 7.5% $Al_2O_3$, 15.0% $Li_2O$, 38.0% $TiO_2$, and 4.5% $SiO_2$, respectively in mol % as the oxide, and mixed uniformly, and thereafter placed in a platinum pot and heated and fused for 3 hours while stirring at a temperature of 1500° C. in an electric furnace to obtain a glass melt. The glass melt was thereafter quenched as the melt being heated was dripped from a platinum pipe mounted on the pot into running water at the room temperature to obtain an oxide glass.

When the glass was placed in an electric furnace at 1000° C. to perform crystallization and then subject to measurement of the lithium ion conductivity, the conductivity was found to be $1.3 \times 10^{-3}$ $Scm^{-1}$ at a room temperature. For measurement of the lithium ion conductivity, an impedance analyzer SI-1260, manufactured by Solartron Analytical, was used, and the conductivity was computed upon making a complex impedance measurement by an AC two terminal method. The precipitated crystalline phase was measured using a powder X-ray diffraction measurement device manufactured by Phillips Corp., and it was confirmed that the glass had $Li_{1+x+y}Al_xTi_{2-x}Si_yP_{3-y}O_{12}$ (where 0≤x≤0.4 and 0<y≤0.6) as a main crystalline phase.

The oxide glass was milled by a jet mill manufactured by Kurimoto Ltd., then placed in a ball mill and subject to wet pulverization using ethanol as a solvent to obtain two kind of oxide glass powders having an average particle diameter of 0.7 μm and a maximum particle diameter of 2 μm; and an average particle diameter of 0.5 μm and a maximum particle diameter of 1 μm, respectively. Particle size measurement was performed using a laser diffraction/scattering type particle size distribution measurement device LS100, manufactured by Beckman Coulter, Inc. Distilled water was used as a dispersant.

[Manufacture of Electrolyte Green Sheet]

An electrolyte slurry was prepared using water as a solvent and dispersing and mixing the oxide glass of 0.5 μm average particle diameter with an acrylic-based binder, a dispersant, and an antifoaming agent. The slurry was decompressed to eliminate bubbles and thereafter shaped using a doctor blade and dried to prepare an electrolyte green sheet having a thickness of 30 μm. The slurry contained 10 wt % of the acrylic-based binder, 0.2-0.3 wt % of the antifoaming agent, and 0.2-0.3 wt % of the dispersant, and the rest of the oxide glass; and the content of the oxide glass contained in the electrolyte green sheet was 89.5 wt %.

[Manufacture of Positive Electrode Green Sheet]

Synthesized $LiNiO_2$ was used as a positive electrode active material. A $LiNiO_2$ powder of 5 μm average particle diameter and the oxide glass of 0.5 μm average particle diameter were weighed out at proportions of 75:25 wt %, and dispersed and mixed with the acrylic-based binder and the dispersant using water as the solvent to prepare a positive electrode slurry. The slurry was decompressed to eliminate bubbles and thereafter shaped using a doctor blade and dried to prepare a positive electrode green sheet having a thickness of 30 μm. The content of the binder and the dispersant was 10 wt %, and the content of the oxide glass contained in the positive electrode green sheet was 23 wt %.

[Manufacture of Sintered Laminate Body]

One sheet of the positive electrode green sheet having prepared previously and two sheets of electrolyte green sheets were laminated and then the thus-laminated body was pressed by a heated roll press so as to bond the sheets. The bonded laminate body was pressed and densified at the room temperature using a CIP (cold isotropic press) manufactured by Kobe Steel, Ltd. The thus-prepared laminate body was clamped with a zirconia setter manufactured by KYOCERA Corporation and heated to 400° C. in an electric furnace to remove organic material such as the binder, the dispersant, etc., from the laminate body. The temperature was thereafter raised rapidly to at 900° C. and then held thereat for 5 minutes, and cooling was performed to prepare a laminated sintered body of the positive electrode and electrolyte. The content of the oxide glass in the above-mentioned laminate before the sintering was 56 wt % of the total weight of the laminate. And the content of the glass ceramic of which the oxide glass was crystallized after the sintering was 62 wt % of the total weight of the sintered laminate body. Also, the average particle diameter of the crystallized particle of the oxide glass after the sintering was 0.8 μm.

[Manufacture of Negative Electrode]

On the electrolyte side of the laminate prepared as described above, a thin film of $Li_3PO_{3.8}N_{0.2}$ was formed on the solid electrolyte under a nitrogen atmosphere by an RF magnetron sputtering equipment (manufactured by Tokki Corp.) using $Li_3PO_4$, manufactured by Nippon Chemical Industrial Co., Ltd., as a target. By adhering Li metal (manufactured by Honjo Energy Systems) of 0.1 mm thickness on the thin film, a laminate of a positive electrode, electrolyte, and negative electrode was prepared.

[Manufacture of all Solid State Lithium Ion Secondary Battery]

A positive electrode current collector was fixed to the positive electrode side of the laminate sintered body prepared as described above with an aluminum paste applied to the positive electrode side, which was dried and sintered. An aluminum foil was connected as a positive electrode lead to the positive electrode side, a copper foil was connected as a negative electrode lead to the negative electrode side, and the laminate sintered body was sealed in an aluminum laminate film having an insulation coating interior to prepare a lithium ion battery. The prepared battery discharged at an average voltage of 3.6 V and was a rechargeable battery.

EXAMPLE 2

[Manufacture of Positive Electrode Green Sheet]

As a positive electrode active material, $LiCoO_2$ manufactured by Nippon Chemical Industrial Co., Ltd. was used. A $LiCoO_2$ powder of 6 μm average particle diameter and the oxide glass of 0.7 μm average particle diameter were weighed out at proportions of 70:30 wt %, and dispersed and mixed with the acrylic-based binder and the dispersant using water as the solvent to prepare a positive electrode slurry. The slurry was decompressed to eliminate bubbles and thereafter shaped using a continuous type of roll coater and dried to prepare a positive electrode green sheet having a thickness of 20 μm. The content of the binder and the dispersant was 10 wt %, and the content of the oxide glass contained in the positive electrode green sheet was 27 wt %.

[Manufacture of Electrolyte Green Sheet]

An electrolyte slurry was prepared using water as a solvent and dispersing and mixing the oxide glass of 0.7 μm average particle diameter with an acrylic-based binder, a dispersant, and an antifoaming agent. The slurry was decompressed to eliminate bubbles and thereafter shaped using a doctor blade and dried to prepare an electrolyte green sheet having a thickness of 30 μm. The slurry contained 10 wt % of the acrylic-based binder, 0.2-0.3 wt % of the antifoaming agent, and 0.2-0.3 wt % of the dispersant, and the rest of the oxide glass. The content of the oxide glass contained in the electrolyte green sheet was 89.5 wt %.

[Manufacture of Negative Electrode Green Sheet]

As a negative electrode active material, $Li_4Ti_5O_{12}$, manufactured by Ishihara Sangyo Kaisha, Ltd., was used upon annealing at 500° C. A $Li_4Ti_5O_{12}$ powder of 5 μm average particle diameter and the oxide glass of 0.5 μm average particle diameter were weighed out at proportions of 80:20 wt %, and dispersed and mixed with the acrylic-based binder and the dispersant using water as the solvent to prepare a negative electrode slurry. The slurry was decompressed to eliminate bubbles and thereafter shaped using a continuous roll coater and dried to prepare a negative electrode green sheet having a thickness of 20 μm. The content of the binder and the dispersant was 10 wt %, and the contents of the oxide glass and the glass ceramic contained in the positive electrode green sheet were 18 wt % each.

[Manufacture of Sintered Laminate Body]

The electrolyte green sheet prepared as described above was disposed between one sheet of positive electrode green sheet and one sheet of negative green sheet to form a laminate and the laminated body was pressed by a heated roll press so as to be bonded between the sheets. The bonded laminate body was pressed and densified at the room temperature using a CIP (cold isotropic press). The thus-prepared laminate body was clamped with a zirconia setter on the positive electrode side of the body and with another zirconia setter on the negative electrode side of the body, and then the clamped body with the setters was heated to 400° C. in an electric furnace to remove organic substance such as the binder, the dispersant, etc., from the laminate body. The temperature was thereafter raised rapidly to at 850° C. and then held thereat for 7 minutes, and, immediately thereafter, cooling was performed to prepare a sintered laminate body made from the positive electrode, electrolyte, and negative electrode green sheets.

The content of the oxide glass in the laminate body before sintering was 51 wt % of the total weight of the laminate body. After sintering, the content of the glass ceramic of which the oxide glass crystallized was 57 wt % of the total weight of the sintered laminate body. Also after sintering, the particle diameter of particles resulting from crystallization of the oxide glass was 0.6 μm on the average.

[Manufacture of all Solid State Lithium Ion Secondary Battery]

A positive electrode current collector was fixed to the positive electrode side of the laminate sintered body prepared as described above with an aluminum paste applied to the positive electrode side, which was dried and sintered. A negative electrode current collector was fixed to the negative electrode side with a copper paste printed on the negative electrode side, which was thereafter dried and sintered. An aluminum foil was connected as a positive electrode lead to the positive electrode side, a copper foil was connected as a negative electrode lead to the negative electrode side, and the laminate sintered body was sealed in an aluminum laminate film having an insulation coating interior to prepare a lithium ion battery. The prepared battery discharged at an average voltage of 2.5 V and was a rechargeable battery.

COMPARATIVE EXAMPLE 1

Except for adding no oxide glass to the positive electrode green sheet or the negative electrode green sheet of the above Example 2, a laminate of a positive electrode, an electrolyte, and a negative electrode was prepared in the same way as described in the above Example 2. When the laminate was sintered under the same conditions as described in the Example 2, the electrolyte layer (from the electrolyte green sheet) and the negative electrode layer (from the negative electrode green sheet) were separated such that subsequent processes for the battery preparation could not be performed.

As described above, in Examples 1 and 2, because the oxide glass, in which lithium ion conducting crystallines were precipitated, was contained in the electrolyte and positive electrode green sheets (and furthermore in the negative electrode green sheet in the case of Example 2), a laminate of high ion conducting property could be obtained by expression of an ion conducting property by sintering and a battery thereof could be produced. Also, since the positive electrode green sheet and the negative electrode green sheet, each of which contained the oxide glass, were sintered, the laminate was sintered as the oxide glass might have acted as a binder in Example 2 such that the battery thereof was produced, but in Comparative example 1, in which the oxide glass was not added to the positive or negative electrode green sheet, the sheets were separated such that the laminate body could not be sintered well.

In accordance with the above embodiments, a method for manufacturing a lithium ion secondary battery and a lithium ion secondary battery manufactured by such a method can be provided.

A method of manufacturing a lithium ion secondary battery comprising the steps of: forming a laminate by laminating an electrolyte green sheet and a positive electrode green sheet; and sintering the laminate is provided. At least one of the electrolyte green sheet and the positive electrode green sheet contains an amorphous oxide glass powder in which a crystalline having a lithium ion conducting property is precipitated in the step of sintering.

Here, a green sheet may mean an unsintered body formed in a thin plate shape out of the mixture obtained by mixing a powder of ceramics comprising unsintered glass or other inorganic oxide or a combination thereof as a main component with an organic binder, a plasticizer, a solvent, etc. The thin plate shape can be made with the mixed slurry by utilizing a doctor blade or calender method; coating methods such as spin coating and dip coating; printing method such as inkjet, bubble jet (registered trademark), offset; a die coater method; a spray method; etc. This unsintered green sheet is flexible and can be cut into any shape or laminated with each other.

Here, as the lithium ion conductive crystallines to be used, crystallines having a perovskite structure with a lithium ion conductive property such as LiN, LISICON, $La_{0.55}Li_{0.35}TiO_3$, etc., which have advantages in the ion conductivity if no crystal gain boundaries are included, crystallines having NASICON type structure such as $LiTi_2P_3O_{12}$, or glass ceramics having such crystallines precipitated may be utilized. As a preferable lithium ion conductive crystalline, for example, a crystalline of $Li_{1+x+z}M_x(Ge_{1-y}Ti_y)_{2-x}Si_zP_{3-z}O_{12}$ (where $0 \leq x \leq 0.8$ and $0 \leq y \leq 1.0$, $0 \leq z \leq 0.6$, and M is Al and/or Ga) can be used. It is more advantageous with respect to the ion conduction if the crystalline does not contain any crystal grain boundaries that inhibit ion conduction. In particular, a glass ceramic is more preferable since it has hardly any vacancies or crystal grain boundaries that inhibit the ion conduction such that it has a high ion conducting property and yet has an excellent chemical stability. Although a single crystal form of the above-mentioned ctystallines can be utilized as an excellent material other than the glass ceramics that has hardly any vacancies or crystal grain boundaries that inhibit the ion conduction, it is very difficult to manufacture a single crystal such that it costs a lot. A lithium ion conducting glass ceramic has an advantage in terms of easiness of manufacture thereof as well as a low cost for manufacture thereof.

The lithium ion conducting glass ceramics may include those comprising a base glass which has a composition in the $Li_2O—Al_2O_3—TiO_2—SiO_2—P_2O_5$ system. For example, a glass ceramic having $Li_{1+x+z}M_x(Ge_{1-y}Ti_y)_{2-x}Si_zP_{3-z}O_{12}$ (where $0 \leq x \leq 0.8$, $0 \leq y \leq 0.1$, $0 \leq z \leq 0.6$, and M is either or both selected from Al and Ga) as a main crystalline phase after the heat treatment for the crystallization may be utilized. The fractions of the lithium ion conducting glass ceramic and the base glass can be changed as appropriate according to the required ion conductivity, sintering conditions, etc.

Here, the glass ceramics are materials to be obtained by the heat treatment of glass such that crystalline phases are precipitated in a glass phase. The glass ceramics may include materials constituted of amorphous solid substances and crystallines. The crystalline precipitation can be detected by the X-ray diffraction method if a crystalline layer is formed after a nuclei of crystalline is generated and grows large enough. If the glass ceramics hardly have vacancies, the glass ceramics may also include material in which the entire glass phase has been changed into a crystalline phase, that is, the crystalline amount in the materials has become 100 mass % (degree of crstallinity is 100%). In general, the so-called ceramics and sintered body cannot avoid the existence of vacancies between crystal grains or grain boundaries and crystal grain boundaries because of the method of producing the same such that the glass ceramics can be distinguished from them. Especially in regard to ion conduction, the value of conductivity of such ceramic is considerably much lower than that of the crystalline particle itself because of existence of vacancies and crystal grain boundaries. Since it is possible to prevent the decrease of the ion conductivity between crystal grains by controlling the crystallization process of the glass ceramics, the ion conductivity of the entire body can be kept as much as that of the crystal grain.

In the present invention, the electrolyte green sheet is formed into a solid electrolyte after the sintering step. However, if pores remain inside the sheet the ion conductivity of the electrolyte as a whole is lowered because the pores do not contribute as ion conducting pathways. In general, when the ion conductivity of the electrolyte is high, a transfer rate of lithium ions is high and an output of a battery manufactured using the solid electrolyte is high. The electrolyte thus preferably has a low porosity. For example, a porosity of not exceeding 20 vol % is preferable. The porosity is more preferably not exceeding 15 vol % and even more preferably not exceeding 10 vol %.

Here, the porosity is a proportion of vacancies contained in a unit volume and is expressed by the following formula:

Porosity (%)=(True density−Apparent density)/True density×100.

Here, the "true density" may signify a true solid density of the material. Meanwhile, the "apparent density" is a density determined by dividing a weight of an object by an apparent volume and is a density of the object that includes the vacancies.

Here, the step of forming the laminate by overlaying is not limited to the case where the laminate is formed by laminating the electrolyte layer having prepare beforehand and the positive electrode layer having prepare beforehand. A method of preparing either electrolyte layer or positive electrode layer; then depositing the other layer onto the prepared layer by at least one method selected from the group consisting of pressure bonding, sputtering, thermal deposition, precursor coating, printing, etc.; and forming the laminate may be included. In regard to production of the electrolyte layer and the positive electrode layer, a method of production using a green sheet is also included.

The step of sintering may signify a step of treating the green sheets at a high temperature to consolidate particles of inorganic substance constituting the green sheets. Preferably in the step of sintering, ventilation is performed to maintain an atmosphere inside the furnace in the constant condition. Although a gas furnace, microwave furnace or other known sintering furnace may be used in the sintering step, the electric furnace is preferably used because of the ambient environment, internal temperature distribution of the furnace, cost for construction, etc.

The method of manufacturing the lithium ion secondary battery as described above is characterized in that the oxide crystalline has an ion conductivity of at least $10^{-5}$ Scm$^{-1}$ at 25° C.

Here, the crystalline may include a crystalline contained in the positive electrode green sheet before sintering. This crystalline may include an oxide crystalline. The oxide crystalline may include the lithium ion conducting glass ceramic.

During charging/discharging of a lithium ion secondary battery, a mobility of lithium ions depends on the lithium ion conductivity and a lithium ion transference number. Thus, it is preferable that a substance having a high lithium ion conducting property and a high lithium ion transference number is used in the positive electrode green sheet of the present invention.

The method for manufacturing the lithium ion secondary battery as described above is characterized in that an amount of the oxide glass powder contained is in a range of 50 wt % to 75 wt % of a total weight of the electrolyte green sheet and the positive electrode green sheet.

The method for manufacturing the lithium ion secondary battery as described above is characterized in that an amount of the oxide glass powder contained in the electrolyte green sheet is in a range of 50 wt % to 100 wt % of a weight of the electrolyte green sheet.

The method for manufacturing the lithium ion secondary battery as described above is characterized in that an amount of the oxide glass powder contained in the positive electrode green sheet is in a range of 5 wt % to 45 wt % of a weight of the positive electrode green sheet.

Here, a weight percent of a weight of the electrolyte green sheet may signify, for example, a percentage expression of the weight of the oxide glass powder divided by the weight of the entire electrolyte green sheet including the weight of the oxide glass powder. Also, a weight percent of a weight of the positive electrode green sheet may signify, for example, a percentage expression of the weight of the oxide glass powder divided by the weight of the entire positive electrode green sheet including the weight of the oxide glass powder.

The method for manufacturing the lithium ion secondary battery as described above is characterized in that the oxide glass powder contained in the electrolyte green sheet has a maximum particle diameter of not exceeding 7 μm.

The method for manufacturing the lithium ion secondary battery as described above is characterized in that the oxide glass powder contained in the electrolyte green sheet has an average particle diameter of not exceeding 3 μm.

Here, the average particle diameter of the oxide glass powder contained in the electrolyte green sheet is preferably not exceeding 3 μm. The average particle diameter is more preferably not exceeding 2.5 μm and most preferably not exceeding 2 μm. By making the oxide glass powder adequately fine so that its average particle diameter is not exceeding 3 μm and thereafter mixing adequately to make a shape body have a uniform composition, a lithium ion conducting solid electrolyte that is dense and low in porosity even after sintering can be obtained. Here, the average particle diameter is a value of D50 (diameter at a cumulative volume percentage of 50%) measured by a laser diffraction method, and specifically, a value measured using a particle size distribution measurement device LS100Q or a submicron particle analyzer N5, manufactured by Beckman Coulter, Inc., as a measurement device may be used. The average particle diameter is a value expressed on a basis of volume. Use of the abovementioned measurement devices is selected according to a particle diameter of an object to be measured. When a maximum particle diameter of the object to be measured is less than 3 μm, measurement is made using just the submicron particle analyzer N5.

The method for manufacturing the lithium ion secondary battery as described above is characterized in that the oxide glass powder contained in the positive electrode green sheet has a maximum particle diameter of not exceeding 3 μm.

The method for manufacturing the lithium ion secondary battery as described above is characterized in that the oxide glass powder contained in the electrolyte green sheet has an average particle diameter of not exceeding 1 μm.

Here, the average particle diameter of the oxide glass powder contained in the positive electrode green sheet is preferably not exceeding 1 μm. The average particle diameter is more preferably not exceeding 0.9 μm and most preferably not exceeding 0.8 μm. By making the oxide glass powder adequately fine so that its average particle diameter is not exceeding 1 μm and thereafter mixing adequately to make a formed body have a uniform composition, a lithium ion conducting solid electrolyte that is dense and low in porosity even after sintering can be obtained.

In the case where the oxide glass powder, which is an inorganic powder, is to be formed into an arbitrary shape and then sintered in order to obtain a shaped body, if a sintering property of the powder is satisfactory, a satisfactory shaped body can be obtained by pressing and sintering even without rigorously controlling the average particle diameter and a particle size distribution. However, in the case where an inorganic powder with a poor sintering property is to be used, since the average particle diameter has a strong influence on a density of the shaped body obtained by sintering, it is more necessary to make the average particle diameter small if the sintering property is poor, and the particle size distribution is preferably controlled as well in some cases. When the particle size distribution of a raw material powder is broad and large particles exist, the sintering property degrades and there is a possibility that a dense sintered body cannot be obtained. It is necessary to reduce the number of large particles in the raw material powder. Thus, in the electrolyte green sheet, the maximum particle diameter of the oxide glass powder is preferably not exceeding 7 μm, more preferably not exceeding 5 μm, and most preferably not exceeding 3 μm, and in the positive electrode green sheet, the maximum particle diameter of the oxide glass powder is preferably not exceeding 3 μm, more preferably not exceeding 2 μm, and most preferably not exceeding 1 μm.

The method for manufacturing the lithium ion secondary battery as described above is characterized in that a sintering temperature in the step of sintering is at least 700° C.

The method for manufacturing the lithium ion secondary battery as described above is characterized in that a sintering time at a sintering temperature of at least 700° C. is not exceeding one hour in the step of sintering.

By setting the sintering temperature to at least 700° C., the amorphous oxide glass powder can be made to contain a precipitated lithium conducting crystalline. If the sintering time is within 1 hour, it is hardly possible for the oxide glass powder to react very much with metal oxides and other electrode materials contained in the positive electrode green sheet.

The method for manufacturing the lithium ion secondary battery as described above is characterized in that the positive electrode green sheet is formed in a pattern on the electrolyte green sheet in the step of forming.

Here, that the positive electrode green sheet is formed in a pattern on the electrolyte green sheet may include that a plurality of small pieces of the positive electrode green sheet are formed in a line with a constant interval on a larger electrolyte green sheet. If the electrolyte green sheet is cut out along a groove between the aligned pieces of the positive electrode, the laminate can be divided into pieces of a predetermined size. These pieces may be sintered under the predetermined condition such that the predetermined size of batteries may be produced.

The method for manufacturing the lithium ion secondary battery as described above further comprises the step of forming a negative electrode layer on the sintered laminate after the step of sintering.

Although a thickness of the film is preferably thinner to make the battery more compact and lightweight, approximately 30 μm is preferable in consideration of mechanical strength, etc.

The method for manufacturing the lithium ion secondary battery as described above is characterized in that the step of forming the negative electrode layer comprises the steps of: depositing a negative electrode active material on the sintered laminate by at least one method selected from pressure bonding, sputtering, thermal deposition, and precursor coating; and sintering the laminate on which the negative electrode active material is deposited.

Here, the step of forming the layer may include the step of forming the laminate constituted of the electrolyte layer and the positive electrode layer; and depositing a negative electrode layer by at least one method selected from the group consisting of pressure bonding, sputtering, thermal deposition, precursor coating, printing, etc., on the opposite side of the face on which the positive electrode layer is formed. Also, the step of forming the layer may be performed by pressure bonding, sputtering, thermal deposition, precursor coating, and printing methods, and a combination thereof. Precursor coating may include a method of applying a precursor material containing the negative electrode active material and thereafter drying, etc., to form the film.

The method for manufacturing the lithium ion secondary battery as described above is characterized in that the step of forming the laminate comprises the step of laminating the electrolyte green sheet between a negative electrode green sheet and the positive electrode green sheet.

The method for manufacturing the lithium ion secondary battery as described above is characterized in that the negative electrode green sheet contains an amorphous oxide glass powder in which a crystalline having a lithium ion conducting property is precipitated in the step of sintering.

The method for manufacturing the lithium ion secondary battery as described above is characterized in that an amount of the oxide glass powder contained in at least one of the electrolyte green sheet, the positive electrode green sheet, and the negative electrode green sheet is in a range of 30 wt % to 80 wt %.

The method for manufacturing the lithium ion secondary battery as described above is characterized in that an amount of the oxide glass powder contained in the negative electrode green sheet is in a range of 5 wt % to 45 wt % of a weight of the negative electrode green sheet.

The method for manufacturing the lithium ion secondary battery as described above is characterized in that the negative electrode green sheet is formed on the electrolyte green sheet in a pattern in the step of forming the laminate.

Forming the negative electrode green sheet in a pattern on the electrolyte green sheet includes forming small pieces of negative electrode green sheet in a predetermined shape with a predetermined interval as aligned in a predetermined manner on a large electrolyte green sheet. After sintering, the laminate can be cut apart along grooves between the negative electrodes, thereby separating pieces of a predetermined size that could be made the battery size. Or the laminate can be partitioned in a predetermined size by cutting apart the electrolyte green sheet along the grooves between the aligned negative electrode green sheets. By then sintering under predetermined conditions, the partition size can be made the battery size. Efficient battery production is thereby enabled.

The method for manufacturing the lithium ion secondary battery as described above is characterized in that the laminate is held at a sintering temperature in the step of sintering such that an average particle diameter of the precipitated crystalline is not exceeding 1 μm.

Here, the average particle diameter of crystalline particles refers to a median cumulative value ("median diameter" d50) of particle diameters on area basis of crystalline images (n=100) measured from scanning electron microscope (SEM) images. The particle diameter is a value of a distance between a pair of parallel straight lines, among pairs of parallel straight lines that sandwich a crystalline image obtained, for which the distance is the maximum.

In regard to the sintering temperature at which the average particle diameter of the precipitated crystallines becomes not exceeding 1 μm, a plurality of samples of the amorphous oxide glass in which the lithium ion conducting crystallines precipitate in the step of sintering may be heat treated under different temperature conditions, the average particle diameter of the precipitated crystallines may be measured under the different conditions by the method described above, and a temperature condition with which the average particle diameter was not exceeding 1 μm may be employed.

The average particle diameter of the precipitated crystallines can be controlled by controlling the sintering temperature to be held in the step of sintering the laminate. Setting of the sintering temperature to be held according to the type of the amorphous oxide glass in which the lithium ion conducting crystallines precipitate may be included. For example, in a case of the oxide glass described below, setting of the sintering temperature in a range of 700° C. to 1000° C. may be included.

The method for manufacturing the lithium ion secondary battery as described above is characterized in that the oxide glass powder contains:
10 to 25 mol % of $Li_2O$,
0.5 to 15 mol % of $Al_2O_3$ and/or $Ga_2O_3$,
25 to 50 mol % of $TiO_2$ and/or. $GeO_2$,
0 to 15 mol % of $SiO_2$, and
26 to 40 mol % of $P_2O_5$.
where each amount is in mol % based on the oxide as a unit compound.

The $Li_2O$ component is an essential component that provides $Li^+$ ion carriers and realizes a lithium ion conductive property. To obtain a good conductivity, the lower content limit of the. $Li_2O$ component is preferably 10 mol %, more preferably 11 mol %, and even more preferably 12 mol %. The upper content limit of the $Li_2O$ component is preferably 25 mol %, more preferably 24 mol %, and even more preferably 23 mol % since to much $Li_2O$ component may cause degradation of the thermal stability of the glass.

The $Al_2O_3$ and/or $Ga_2O_3$ component can increase the thermal stability of the base glass, and at the same time, $Al^{3+}$ ions and/or $Ga^{3+}$ ions can undergo solid dissolution in the crystalline phase to improve the lithium ion conductivity. To realize such effects, the lower content limit of the $Al_2O_3$ and/or $Ga_2O_3$ component is preferably 0.5 mol %, more preferably 1 mol %, and most preferably 1.5 mol %. Since the thermal stability of glass could rather degrade and the ion conductivity of the glass ceramic could also decrease if the content of the $Al_2O_3$ and/or $Ga_2O_3$ component exceeds 15 mol %, the upper content limit is preferably 15 mol %. And the upper content limit is more preferably 14 mol % and most preferably 13 mol %.

The $TiO_2$ and/or $GeO_2$ component contributes to glass formation and constitutes the crystalline phase as a component so as to be a useful component in both the glass and crystalline phases. In order to obtain a high ion conductivity of the glass ceramic by precipitating the crystalline phase as a main phase from the glass phase, the lower content limit thereof is preferably 25 mol %, more preferably 26 mol %, and most preferably 27 mol %. The upper content limit is preferably 50 mol %, more preferably 49 mol %, and most preferably 48 mol % since too much of the $TiO_2$ and/or $GeO_2$ component may cause degradation in the thermal stability and decrease of the conductivity of the glass ceramics.

The $SiO_2$ component can improve a fusing property (fusibility) and the thermal stability of the base glass and at the same time, $Si^{4+}$ ions undergo solid dissolution in the crystalline phase to improve a lithium ion conductivity. To achieve this effect adequately, the lower content limit is preferably 0 mol %, more preferably 1 mol %, and most preferably 2 mol %. However, because the conductivity could rather decrease readily if the content exceeds 15 mol %, the upper content limit is preferably 15 mol %, more preferably set to 14 mol %, and most preferably set to 13 mol %.

The $P_2O_5$ component is an essential component for glass formation and is also a component of the crystalline phase. Because vitrification becomes difficult when the content is less than 26 mol %, the lower content limit is preferably 26 mol %, more preferably 27 mol %, and most preferably 28 mol %. However, because it becomes difficult for the crystalline phase to precipitate from the glass such that desired characteristics may not be obtained if the content exceeds 40 mol %, the upper content limit is preferably 40 mol %, more preferably 39 mol %, and most preferably 38 mol %.

With the above-described compositions, it is possible to obtain glass easily by casting fused glass, and a glass ceramic having the above-described crystalline phase obtained by heat treatment of the glass has a high lithium ion conducting property. Besides the above-described composition, as long as the glass ceramic has a similar crystal structure, a portion or all of the $Al_2O_3$ may be replaced by $Ga_2O_3$ and a portion or all of the $TiO_2$ may be replaced by $GeO_2$. Furthermore, to lower a melting point of the glass ceramic or improve the stability of glass in manufacturing the glass ceramic, other raw materials may be added within a range in which the ion conducting property is not largely degraded.

It is preferable that the glass ceramic composition contains no other alkali metal like $Na_2O$ or $K_2O$ than $Li_2O$ if it is possible. When any of these components are present, conduction of Li ions may be inhibited and the ion conductivity may be decreased by an alkali ion mixing effect. Since the chemical durability and stability of the glass ceramic degrade although improvement of the lithium ion conducting property can be anticipated if sulfur is added to the glass ceramic composition, it is preferable that the glass ceramic composition contains no sulfur if it is possible. It is preferable that the glass ceramic composition contains none of Pb, As, Cd, Hg, or other components that may be harmful to the environment or the human body if it is possible.

The method for manufacturing the lithium ion secondary battery as described above is characterized in that the crystalline comprises a crystalline of $Li_{1+x+z}M_x(Ge_{1-y}Ti_y)_{2-x}Si_zP_{3-z}O_{12}$ (where $0 \leq x \leq 0.8$, $0 \leq y \leq 1.0$, $0 \leq z \leq 0.6$, and M is either or both of Al and Ga).

The composition described below is indicated as an example of a preferable mode of the lithium ion conducting inorganic powder. A powder made from a glass having this composition can be cited as an example of a powder with which the ion conductivity increases to no less than $1 \times 10^{-5}$ $Scm^{-1}$ at 25° C. upon being subject to both or either of pressurization and sintering. A glass ceramic with crystallines precipitated therein that is obtained by heat treating a glass with the above composition as a base glass is a glass ceramic having $Li_{1+x+z}M_x(Ge_{1-y}Ti_y)_{2-x}Si_zP_{3-z}O_{12}$ (where $0 \leq x \leq 0.8$, $0 \leq y \leq 1.0$, $0 \leq z \leq 0.6$, and M is at least one element selected from among Al and Ga) as the main crystalline phase.

The method for manufacturing the lithium ion secondary battery as described above is characterized in that the step of forming the laminate comprises the step of laminating a circuit substrate on at least either positive electrode green sheet side or negative electrode green sheet side of the laminate.

A lithium ion secondary battery manufactured by the method as recited above may be provided.

The present invention includes the step of forming the laminate by overlaying the electrolyte green sheet and the positive electrode green sheet and the step of sintering the laminate. At least one of the electrolyte green sheet and the positive electrode green sheet contains the amorphous oxide glass powder in which the lithium ion conducting crystalline is precipitated in the step of sintering. Because a portion of the oxide glass powder thus functions as a binder and the solid electrolyte layer and the positive electrode layer do not become separated, the laminate can be fused. Also, because a portion of the oxide glass powder is precipitated as a crystalline by the sintering, thereby expressing an ion conducting property, the laminate can be made to have a high ion conducting property.

What is claimed is:

1. A method of manufacturing a lithium ion secondary battery comprising the steps of:
    forming a laminate by laminating an electrolyte green sheet and a positive electrode green sheet; and
    sintering the laminate,
    wherein a total amount of a first oxide glass powder contained in the electrolyte green sheet and a second oxide glass powder contained in the positive electrode green sheet is in a range of 50 wt % to 75 wt% of a total weight of the electrolyte green sheet and the positive electrode green sheet,
    wherein the first oxide glass powder and the second oxide glass powder contain:
    10 to 25 mol % of $Li_2O$,
    0.5 to 15 mol % of $Al_2O_3$ and/or $Ga_2O_3$,
    25 to 50 mol % of $TiO_2$ and/or $GeO_2$,
    0 to 15 mol % of $SiO_2$, and
    26 to 40 mol % of $P_2O_5$,
    wherein the positive electrode green sheet contains the second oxide glass powder in which a crystalline phase having a lithium ion conducting property is precipitated in the step of sintering at a sintering temperature such that an average particle diameter of the crystalline phase is not exceeding 1 μm.

2. The method according to claim 1 wherein the crystalline phase has an ion conductivity of at least $10^{-5} Scm^{-1}$ at 25° C.

3. The method according to claim 1 wherein an amount of the first oxide glass powder contained in the electrolyte green sheet is in a range of 50 wt % to 100 wt % of a weight of the electrolyte green sheet.

4. The method according to claim 1 wherein an amount of the second oxide glass powder contained in the positive electrode green sheet is in a range of 5 wt % to 45 wt % of a weight of the positive electrode green sheet.

5. The method according to claim 1 wherein the first oxide glass powder contained in the electrolyte green sheet has a maximum particle diameter of not exceeding 7 µm.

6. The method according to claim 1 wherein the first oxide glass powder contained in the electrolyte green sheet has an average particle diameter of not exceeding 3 µm.

7. The method according to claim 1 wherein the first oxide glass powder contained in the electrolyte green sheet has an average particle diameter of not exceeding 1 µm.

8. The method according to claim 1 wherein the second oxide glass powder contained in the positive electrode green sheet has a maximum particle diameter of not exceeding 3 µm.

9. The method according to claim 1 wherein the sintering temperature in the step of sintering is at least 700° C.

10. The method according to claim 1 wherein a sintering time at the sintering temperature of at least 700° C. is not exceeding one hour in the step of sintering.

11. The method according to claim 1 wherein the positive electrode green sheet is formed in a pattern on the electrolyte green sheet in the step of forming.

12. The method according to claim 1 wherein the crystalline phase comprises a crystalline phase of $Li_{1+x+z}M_x(Ge_{1-y}Ti_y)_{2-x}Si_zP_{3-z}O_{12}$ (wherein $0 \leq x \leq 0.8$, $0 \leq y \leq 1.0$, $0 \leq z \leq 0.6$, and M is either or both of Al and Ga.

13. The method according to claim 1 further comprising the step of forming a negative electrode layer on a sintered laminate after the step of sintering.

14. The method according to claim 13 wherein the step of forming the negative electrode layer comprises the steps of:
 depositing a negative electrode active material on the sintered laminate by at least one method selected from pressure bonding, sputtering, thermal deposition, and precursor coating; and
 sintering the laminate on which the negative electrode active material is deposited.

15. The method according to claim 1 wherein the step of forming the laminate comprises the step of laminating the electrolyte green sheet between a negative electrode green sheet and the positive electrode green sheet.

16. The method according to claim 15 wherein the negative electrode green sheet contains a third oxide glass powder in which a crystalline phase having a lithium ion conducting property is precipitated in the step of sintering.

17. The method according to claim 16 wherein an amount of the third oxide glass powder contained in the negative electrode green sheet is in a range of 5 wt % to 45 wt % of a weight of the negative electrode green sheet.

18. The method according to claim 15 wherein the negative electrode green sheet is formed on the electrolyte green sheet in a pattern in the step of forming the laminate.

19. The method according to claim 15 wherein the step of forming the laminate comprises the step of laminating a circuit substrate on at least either a positive electrode green sheet side or a negative electrode green sheet side of the laminate.

* * * * *